US008977313B2

(12) United States Patent
Chao et al.

(10) Patent No.: US 8,977,313 B2
(45) Date of Patent: Mar. 10, 2015

(54) METHOD FOR OPTIMIZING UPLINK POWER-CONTROL PARAMETERS IN LTE

(75) Inventors: Zhijun Chao, Shanghai (CN); Hosein Nikopour, Ottawa (CA); Jianglei Ma, Ottawa (CA)

(73) Assignee: Futurewei Technologies, Inc., Plano, TX (US)

( * ) Notice: Subject to any disclaimer, the term of this patent is extended or adjusted under 35 U.S.C. 154(b) by 246 days.

(21) Appl. No.: 13/475,847

(22) Filed: May 18, 2012

(65) Prior Publication Data

US 2013/0310102 A1 Nov. 21, 2013

(51) Int. Cl.
*H04W 52/04* (2009.01)
*H04W 52/16* (2009.01)
*H04W 52/38* (2009.01)

(52) U.S. Cl.
CPC .............. *H04W 52/16* (2013.01); *H04W 52/38* (2013.01)
USPC .......... 455/522; 455/69; 455/63.1; 455/67.11

(58) Field of Classification Search
CPC ..... H04W 52/04; H04W 52/00; H04W 52/02; H04W 52/06; H04W 52/18; H04W 52/30; H04W 52/38; H04W 52/20; H04W 52/22; H04W 52/225; H04W 52/226; H04W 52/228; H04W 52/143; H04W 52/386
USPC ........ 455/69, 522, 509, 456.6, 436, 501, 448, 455/437, 552.1; 370/329, 328, 332, 336, 370/252, 318
See application file for complete search history.

(56) References Cited

U.S. PATENT DOCUMENTS

| | | | | |
|---|---|---|---|---|
| 5,594,946 | A * | 1/1997 | Menich et al. | 455/522 |
| 7,668,564 | B2 * | 2/2010 | Onggosanusi et al. | 455/522 |
| 2003/0109274 | A1 * | 6/2003 | Budka et al. | 455/522 |
| 2004/0214591 | A1 * | 10/2004 | Lott et al. | 455/522 |
| 2004/0218567 | A1 * | 11/2004 | Budka et al. | 370/332 |
| 2006/0072508 | A1 * | 4/2006 | Zou et al. | 370/332 |
| 2006/0286995 | A1 * | 12/2006 | Onggosanusi et al. | 455/522 |
| 2010/0067496 | A1 * | 3/2010 | Choi | 370/336 |
| 2010/0074130 | A1 * | 3/2010 | Bertrand et al. | 370/252 |
| 2010/0317385 | A1 * | 12/2010 | Kazmi et al. | 455/501 |
| 2011/0081935 | A1 * | 4/2011 | Yeon et al. | 455/522 |
| 2011/0111766 | A1 * | 5/2011 | Yang et al. | 455/452.2 |
| 2012/0004007 | A1 * | 1/2012 | Zhou et al. | 455/522 |
| 2012/0163231 | A1 * | 6/2012 | Bertrand et al. | 370/252 |
| 2012/0238305 | A1 | 9/2012 | Xiao et al. | |
| 2012/0300622 | A1 * | 11/2012 | Kruglick | 370/230 |

(Continued)

FOREIGN PATENT DOCUMENTS

| | | |
|---|---|---|
| CN | 101340216 A | 1/2009 |
| CN | 102076062 A | 5/2011 |

(Continued)

*Primary Examiner* — Tan Trinh (57) ABSTRACT

One embodiment of the present invention provides a system for setting uplink power-control parameters for a cell within a wireless network. During operation, the system receives parameters associated with uplink power for a plurality of user devices within the cell over a predetermined time interval, and averages the received parameters over the user devices and the predetermined time interval to obtain an averaged parameter. The system then determines a set of power-control parameters for the cell based on the averaged parameter, and sends the set of power-control parameters to the user devices to allow the user devices to control transmission power using the set of power-control parameters.

21 Claims, 4 Drawing Sheets

(56) References Cited

U.S. PATENT DOCUMENTS

| | | | |
|---|---|---|---|
| 2012/0302263 A1* | 11/2012 | Tinnakornsrisuphap et al. | 455/456.6 |
| 2013/0109432 A1* | 5/2013 | Yang et al. | 455/522 |
| 2013/0114562 A1* | 5/2013 | Seo et al. | 370/329 |
| 2013/0121279 A1* | 5/2013 | Noh et al. | 370/329 |
| 2013/0195025 A1* | 8/2013 | Chatterjee et al. | 370/329 |
| 2013/0208675 A1* | 8/2013 | Shen et al. | 370/329 |
| 2013/0225183 A1* | 8/2013 | Meshkati et al. | 455/448 |
| 2013/0252663 A1* | 9/2013 | Shi et al. | 455/552.1 |
| 2013/0273920 A1* | 10/2013 | Magadi Rangaiah et al. | 455/437 |
| 2013/0279435 A1* | 10/2013 | Dinan | 370/329 |
| 2013/0281093 A1* | 10/2013 | Jung et al. | 455/436 |
| 2013/0310097 A1* | 11/2013 | Smith et al. | 455/509 |
| 2014/0036786 A1* | 2/2014 | Kazmi et al. | 370/329 |

FOREIGN PATENT DOCUMENTS

| | | |
|---|---|---|
| CN | 102291812 A | 12/2011 |
| CN | 102348268 A | 2/2012 |

* cited by examiner

METHOD FOR OPTIMIZING UPLINK POWER-CONTROL PARAMETERS IN LTE

BACKGROUND

1. Field

This disclosure is generally related to Long Term Evolution (LTE) cellular networks. More specifically, this disclosure is related to a method for optimizing uplink power-control parameters in LTE cellular networks.

2. Related Art

Long Term Evolution (LTE) has been viewed as a preferred development path of currently deployed cellular networks, such as GSM (Global System for Mobile), W-CDMA (Wideband Code Division Multiple Access), and HSPA (High Speed Packet Access) networks. Compared with the current 3G/3.5G technologies, LTE delivers higher peak throughput with lower latency. More specifically, the LTE specification provides theoretical downlink peak rates of 300 Mbit/s, uplink peak rates of 75 Mbit/s, and QoS provisions permitting round-trip times of less than 10 ms.

LTE selects orthogonal frequency-division multiplexing (OFDM) as a basic access scheme for downlink due to its superior spectral efficiency and bandwidth scalability. To conserve power, the LTE uplink transmission scheme is based on single-carrier frequency-division multiple access (SC-FDMA), which provides better peak-to-average power ratio (PAPR) properties. The OFDM downlink and the SC-FDMA downlink ensure that there is no or limited intra-cell interference because the resources allocated to different users within a given cell are truly orthogonal. However, inter-cell interference and channel noise still play an important role in the uplink power consumption in LTE devices.

SUMMARY

One embodiment of the present invention provides a system for setting uplink power-control parameters for a cell within a wireless network. During operation, the system determines a power metric for the cell and a type for the cell based on the power metric. The system then transmits a set of power-control parameters for the cell based on the cell type.

In a variation on this embodiment, the wireless network is a Long Term Evolution (LTE) network.

In a variation on this embodiment, the system determines the power-metric based on an uplink path-loss parameter.

In a further variation, the power metric is determined based on an average path loss to a base station in the cell and an average path loss to a base station in a neighboring cell.

In a further variation, the system determines the power metric based on an average uplink path-loss parameter calculated over a plurality of user devices, over a pre-determined time interval.

In a further variation, of the average uplink path-loss parameter is calculated based on one or more of: an arithmetic mean, a geometric mean, and a quadratic mean.

In a further variation, the predetermined time interval is a number of hours, days, or weeks.

In a variation on this embodiment, the system looks up a lookup table indicating mapping between a cell type and a set of power-control parameters.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a method for adaptively setting uplink power-control parameters in LTE networks. During operation, an evolved Node-B (eNode-B) of a given cell obtains an uplink metric, which can be associated with a long-term averaged path-loss for the cell. Such path-loss information can be obtained from Reference Signal Received Power (RSRP) reports sent by User Equipments (UEs) or based on measurements of the uplink receive power strength. Based on the uplink metric, the cell is categorized as a certain cell type, and a table lookup is performed to obtain power-control parameters corresponding to the cell type. Subsequently, eNode-B sends the power-control parameters to UEs, which adjust their uplink transmission power accordingly.

Fractional Power Control

Power control plays an important role in the uplink of LTE cellular networks. More specifically, an appropriate power control scheme is responsible for managing the transmitting power spectral density of each user device in order to reduce the inter-cell interference and to achieve a required Signal-to-Interference-Noise Ratio (SINR) level. According to the standard released by the $3^{rd}$ Generation Partnership Project (3GPP), the LTE uplink power control scheme includes an open loop term and a closed loop term.

Under the open loop power control, the power is set at the UE using parameters sent by the eNode-B (or the base station), and no feedback is sent to the eNode-B regarding the power used for transmission. In contrast, under the closed loop power control, the UE sends feedback to the eNode-B, which then uses the feedback to correct the transmission power of the UE.

The open loop power control is often called Fractional Power Control (FPC) because it allows UEs to partially compensate for the path-loss. FPC is categorized by two main parameters: a target received power $P_0$ and a compensation factor $\alpha$. More specifically, the 3GPP standard has specified the power control formula on the physical uplink shared channel (PUSCH) as:

$$P_{PUSCH} = \min\{P_{max}, P_0 + 10 \log M + P_0 + \alpha PL + \delta_{mcs} + f(\Delta_i)\}, \quad (1)$$

where $P_{max}$ is the maximum power (in dBm) allowed by the UE, M is the number of Physical Resource Blocks (PRBs)

allocated to the UE, PL is the downlink (from eNode-B to UE) path-loss, $\delta_{mcs}$ is a corrective offset that is dependent on modulation and coding scheme (mcs), and $f(\Delta_i)$ is a function that permits use of relative, cumulative or absolute correction values. Depending on the value of the compensation factor $\alpha$, several cases can be distinguished. If $\alpha$ is set as 1, it is a classical power control scheme that is similar to the one implemented in CDMA. This scheme totally compensates for the path-loss in order to reach the target received power $P_0$. All UEs of the cell, whatever their location, see their signals received with the same power at the eNode-B. If $\alpha$ is set as 0, the transmission power of the UEs is fixed and does not depend on the path-loss. There is no compensation and, in fact, no power control at all. UEs closed to the eNode-B are received with a higher power, while cell edge UEs are received with a weaker signal. In FPC, where path-loss is partially compensated for by the power control scheme, $\alpha$ is set between 0 and 1. The higher the pass-loss, the smaller the received power at eNode-B. Consequently, cell edge UEs are received with a weaker signal, thus create less inter-cell interference. As one can see, increasing the value of $\alpha$ increases the received power of cell edge UEs, but also increases the inter-cell interference. Hence, it is important to choose an appropriate value of $\alpha$ to maximize the cell capacity.

Intensive investigation has been conducted in recent years into optimizing power-control parameters for the interference-limited scenario (also known as Case 1), as well as the noise-limited scenario (also known as Case 3). For example, for the interference-limited scenario, the typical suggested power-control setting is $\alpha=0.8$ and $P_0=-85$ dBm; for the noise-limited scenario, the typical power-control setting is $\alpha=0.4$ and $P_0=-40$ dBm. However, in practice, not all cells can be categorized simply as interference-limited or noise-limited. On the other hand, it is quite impossible to determine the optimal power control parameter case by case. Embodiments of the present invention use a robust self-adaptive approach to adjust the power-control parameters for each cell in an LTE cellular network.

Figure 1:
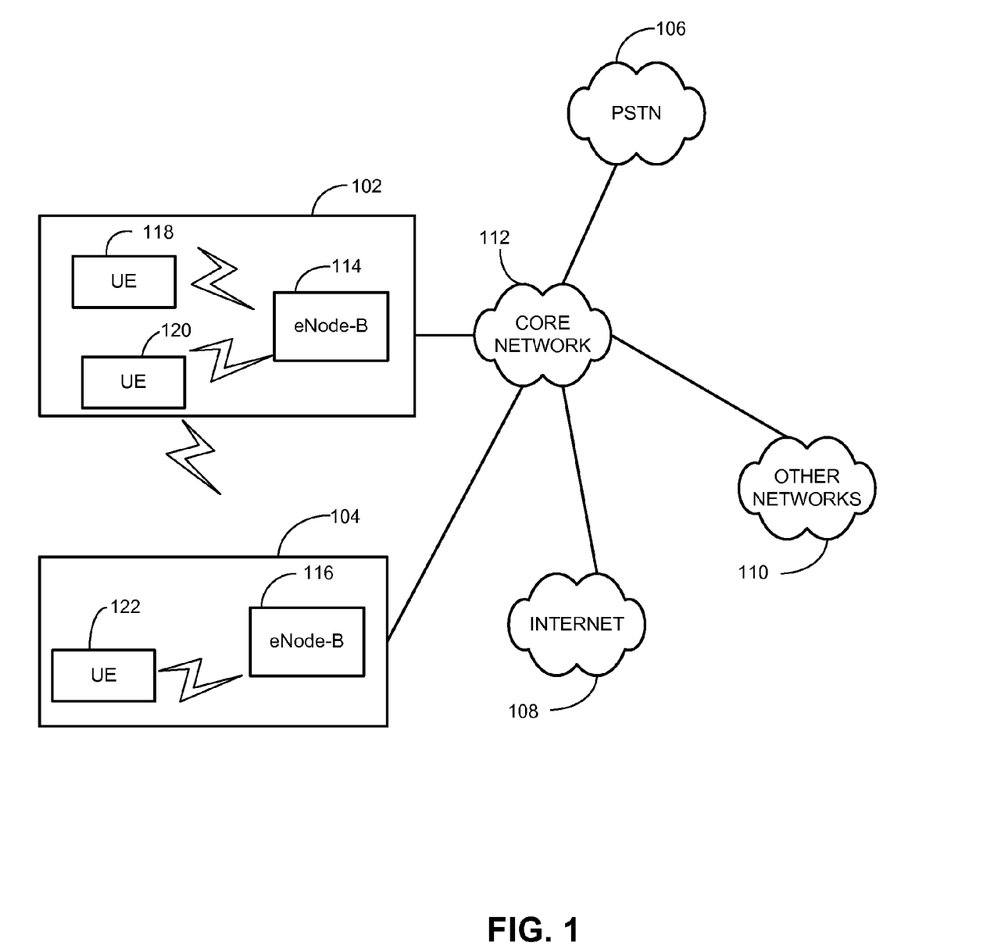
FIG. 1 presents a diagram illustrating an exemplary LTE network.

FIG. 1 presents a diagram illustrating a simplified view of an exemplary LTE architecture. In FIG. 1, a number of LTE eNode-Bs (such as eNode-Bs 114 and 116) are coupled to the public switched telephone network (PSTN) 106, the Internet 108, and other networks (such as network 110) via a core network 112. Each eNode-B communicates with a number of UEs via an air interface within a coverage cell. For example, eNode-B 114 communicates with UEs 118 and 120 with cell 102, and eNode-B 116 communicates with a UE 122 within cell 104. Inter-cell interference originates from UEs, especially cell edge UEs, in a neighboring cell. For example, UE 120 located at the edge of cell 102 can be a main source of interference to cell 104. A proper power control scheme can be used to reduce the transmission power of UE 120 in order to reduce interference to UEs in cell 104, such as UE 122. In a simplified case where the power control is mainly achieved via the settings of $P_0$ and a compensation factor $\alpha$, the transmitted power $P_{TX}$ of a UE can be written (in dBm) as:

$$P_{TX}=P_0+\alpha \cdot PL. \qquad (2)$$

Eq. (2) is also referred to as the FPC formula.

3GPP Case 1 refers to urban macro cells with a typical inter-site distance of 500 m. Due to the closeness of neighboring cells, interference from neighboring cells is significantly higher than thermal noise. Hence, Case 1 is also referred to as an interference-limited scenario. As cell spacing increases, thermal noise becomes more significant. 3GPP Case 3 refers to rural macro cells with a typical inter-site distance of 1732 m, and the relatively large inter-site distance means that Case 3 is noise-limited. Details about 3GPP Case 1 and Case 3 can be found in 3GPP. TR 36.814, available at the 3GPP website (http://www.3GPP.org). Conventional uplink power control schemes rely on a system operator to set the power-control parameters, which are determined ahead of time based on whether the cell is a Case 1 cell or a Case 3 cell. However, not all cells can be clearly categorized as these two extreme cases (i.e., Case 1 and Case 3). Some cells are somewhere in between. Moreover, the amount of inter-cell interference may fluctuate as time changes, thus making a static power control scheme inadequate.

In embodiments of the present invention, instead of relying on a system operator to set the static power-control parameters, the system obtains a long-term path loss power metric for a cell and categorizes the cell as one of the predefined cell types based on the long-term power metric. Each predefined cell type corresponds to a set of power-control parameters that are optimized for the cell type. Subsequently, the system dynamically sets power-control parameters for UEs in the cell based on the cell type. In one embodiment, the long-term power metric includes averaged path-loss for UEs within the cell (also called the serving cell to distinguish it from other neighboring cells). In a further embodiment, the long-term power metric includes averaged path-loss from UEs in a serving cell to other neighboring cells. In one more embodiment, the long-term power metric includes a combination of the averaged path-loss to the serving cell and the averaged path-loss to neighboring cells. Note that, in LTE networks as specified by 3GPP, UEs measure two parameters on the reference signal: Reference Signal Received Power (RSRP) and Reference Signal Received Quality (RSRQ), and report these parameters to the serving cell. The path-loss of the UEs to the serving cell and to one or more neighboring cells can be extracted from the RSRP reports received by the eNode-B.

Figure 2:
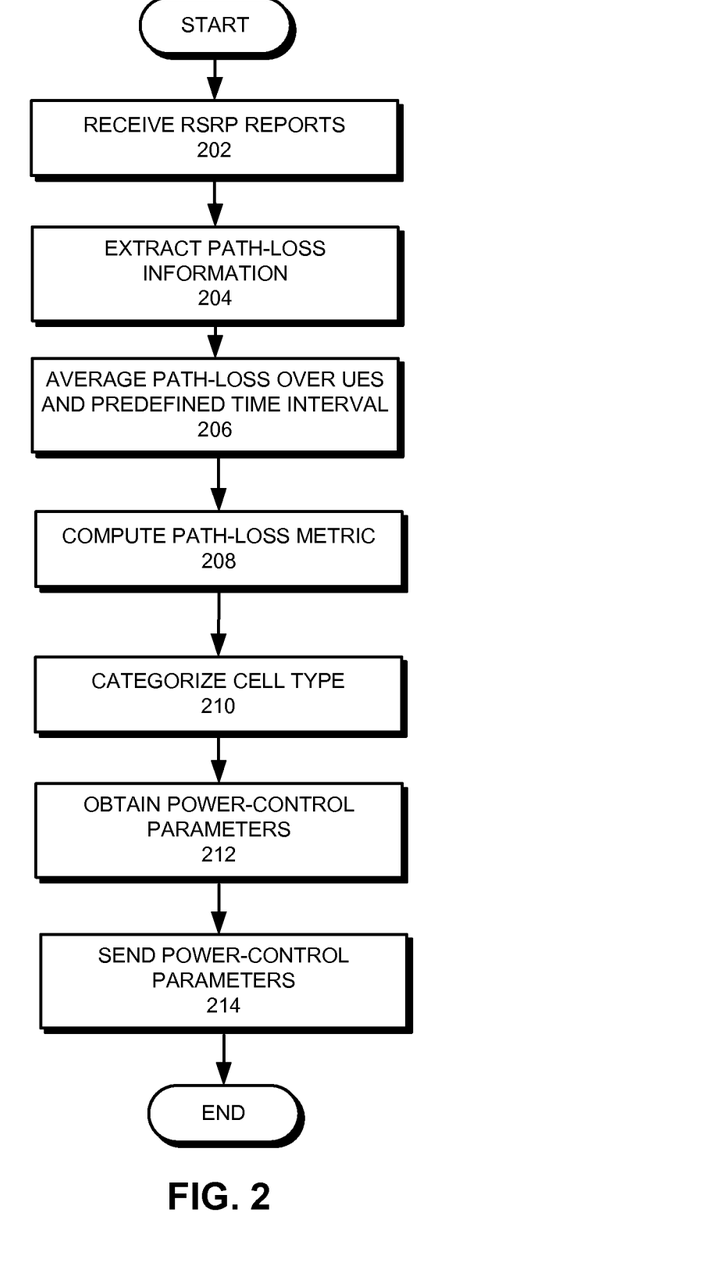
FIG. 2 presents a flowchart illustrating an exemplary process for setting uplink power-control parameters, in accordance with an embodiment of the present invention.

FIG. 2 presents a flowchart illustrating an exemplary process for setting uplink power-control parameters, in accordance with an embodiment of the present invention. During operation, the eNode-B of a cell receives RSRP reports from UEs within the cell (operation 202), and extracts path-loss information from each RSRP report (operation 204). In one embodiment, the path-loss information includes path-loss to the current serving cell as well as path-loss to other neighboring cells. In one embodiment, the eNode-B measures the path-loss from the UEs within the cell directly based on the signal strength of the received uplink signal. The eNode-B then averages the path-loss over the participant UEs and over a predefined time interval (operation 206). In one embodiment, the predefined time interval is significantly longer compared with the power-control time parameters specified by 3GPP, which are in the range of milliseconds. In a further embodiment, the eNode-B averages the path-loss over a number of hours, days, or weeks. In addition, to obtain the average path-loss to the serving cell, the eNode-B averages the path-loss over all active UEs within the cell; to obtain the average path-loss to the neighbors, the eNode-B averages the path-loss over all UEs that report RSRP. Note that the averaging can be done in either the linear or the dB domain. Furthermore, it is possible that during certain time period the UEs in the cell do not transmit RSRP report. In such cases, the eNB can use some predetermined or historical power metric in place of the received path-loss information.

A metric that measures the average path-loss to the serving cell (also called the loss-to-serving-cell metric) provides a clear division between Case 1 cells and Case 3 cells, because Case 3 cells tend to have a much larger path-loss to the serving cell due to their larger sizes. If the main concern of the system is the signaling quality of the uplink received signal, this metric can be used to categorize cell types. Because uplinks often see more power limited cases than downlinks, the metric that measures the average path-loss to the serving cell is an important metric for the uplink to identify the noise-dominated cells.

Similarly, a metric that measures the average path-loss to neighboring cells (also called the loss-to-neighbors metric) also provides a clear division between Case 1 cells and Case 3 cells. If more emphasis is placed on the uplink inter-cell interference than the signal strength of the uplink received signals, this loss-to-neighbors metric can be used to categorize cell types.

Subsequently, the eNode-B computes a path-loss metric based on the extracted pass-loss information (operation 208). In one embodiment, the system combines the loss-to-serving-cell metric and the loss-to-neighbors metric to obtain a combined path-loss metric. Various ways of combining the two metrics can be used. In one embodiment, combining the two path-loss metrics means considering both the average path-loss to the serving cell and the average path-loss to the neighbors when determining power-control parameters. In one more embodiment, the system calculates a combined average path-loss based on the average path-loss to the serving cell and the average path-loss to the neighbors. In a further embodiment, the system obtains the combined path-loss metric by calculating the arithmetic mean, the geometric mean, or the quadratic mean of the two aforementioned path-loss metrics. For example, the combined average path-loss in cell i can be calculated as:

$$J_1(i) = \frac{1}{N} \sum_{j, PL_j^k - PL_j^i < \theta} \sqrt{\frac{(PL_j^i)^2 + (PL_j^k)^2}{2}}, \text{ or}$$

$$J_2(i) = \frac{1}{N} \sum_{j, PL_j^k - PL_j^i < \theta} \sqrt{PL_j^i \times PL_j^k}, \text{ or}$$

$$J_3(i) = \frac{1}{N} \sum_{j, PL_j^k - PL_j^i < \theta} \frac{PL_j^i + PL_j^k}{2};$$

where N is the number of UEs, J(i)s are the combined average path-loss in cell i, $PL_j^i$ is the time-averaged path-loss of UE j to serving cell i, $PL_j^k$ is the time-averaged path-loss of UE j to neighboring cell k, and θ is a threshold value. The summation is calculated over all participant UEs and all neighboring cells. Note that, if for a particular UE, the difference between the path-loss to its neighbors and the path-loss to the serving cell exceeds threshold θ, then that UE is excluded from the summation. Moreover, UEs that do not report RSRP are also excluded from the summation because no path-loss to neighbors can be obtained for those UEs.

Based on the computed pass-loss metric, the eNode-B categorizes the cell as one of the predefined types (operation 210). In one embodiment, the path-loss is mapped to a cell type according to a predefined lookup table. In a further embodiment, mapping the path-loss to a cell type involves comparing the path-loss with one or more pre-determined threshold values. In a simplified model, there are two pre-defined cell types, and the system compares the computed path-loss with a pre-determined threshold value. If the path-loss is less than the threshold, the cell is categorized as a type I cell; if the path-loss is greater than or equal to the threshold, the cell is categorized as a type II cell. Table 1 illustrates exemplary mapping between the path-loss and two types of cells. In a more sophisticated model, there are up to five cell types, and the system compares the computed path-loss with four pre-determined threshold values in order to map the cell to one of the five types. Table 2 illustrates exemplary mapping between the path-loss and five types of cells.

TABLE 1

| Cell Type | Path-loss J(i) |
|---|---|
| I | J(i) < threshold |
| II | J(i) ≥ threshold |

TABLE 2

| Cell Type | Path-loss J(i) |
|---|---|
| I | J(i) < threshold$_4$ |
| II | threshold$_4$ ≤ J(i) < threshold$_3$ |
| III | threshold$_3$ ≤ J(i) < threshold$_2$ |
| IV | threshold$_2$ ≤ J(i) < threshold$_1$ |
| V | J(i) ≥ threshold$_1$ |

The system subsequently obtains power-control parameters corresponding to the cell type (operation 212). These power-control parameters have been previously optimized to best serve the corresponding type of cells. Table 3 illustrates two sets of exemplary power-control parameters corresponding to the two cell types shown in Table 1. Table 4 illustrates five sets of exemplary power-control parameters corresponding to the five cell types shown in Table 2.

TABLE 3

| Cell Type | α | P$_0$ |
|---|---|---|
| I | 0.8 | −80 dBm |
| II | 0.4 | −40 dBm |

TABLE 4

| Cell Type | α | P$_0$ |
|---|---|---|
| I | 0.8 | −82 dBm |
| II | 0.7 | −72 dBm |
| III | 0.6 | −62 dBm |
| IV | 0.5 | −52 dBm |
| V | 0.4 | −42 dBm |

Note that operations 210 and 212 can be combined into a single operation where the lookup table includes the power-control parameters. Hence, the path-loss can be mapped to power-control parameters directly without first being mapped to a cell type. In addition to use a combined path-loss, it is also possible to map power-control parameters based on the individual loss-to-serving-cell metric and loss-to-neighbors metric. Table 5 illustrates an exemplary mapping between the compensation factor α and the two path-loss metrics.

TABLE 5

| α | | Average path-loss to neighbors | | |
|---|---|---|---|---|
| | | No RSRP | L | H |
| Average path-loss to serving cell | L | 0.4 | 0.4 | 0.4 |
| | H | 0.8 | 0.8 | 0.4 |

From Table 5, one can see that if the average path-loss to the serving cell is high and the average path-loss to the neighbors is low, the compensation factor is set as 0.8; otherwise, the compensation factor is set as 0.4. Table 5 also includes a column corresponding to the situation where the path-loss to neighbors is not available due to a lack of RSRP reports. In such a scenario, the compensation factor is determined solely based on the averaged path-loss to the serving cell.

Once the eNode-B obtains the power-control parameters, it sends the power-control parameters to all UEs within the cell, thus allowing the UEs to adjust their uplink transmission power accordingly (operation 214). In one embodiment, the eNode-B can perform operations 202-214 periodically to provide UEs with up-to-date power-control parameters that are obtained based on the most recent RSRP reports.

Figure 3:
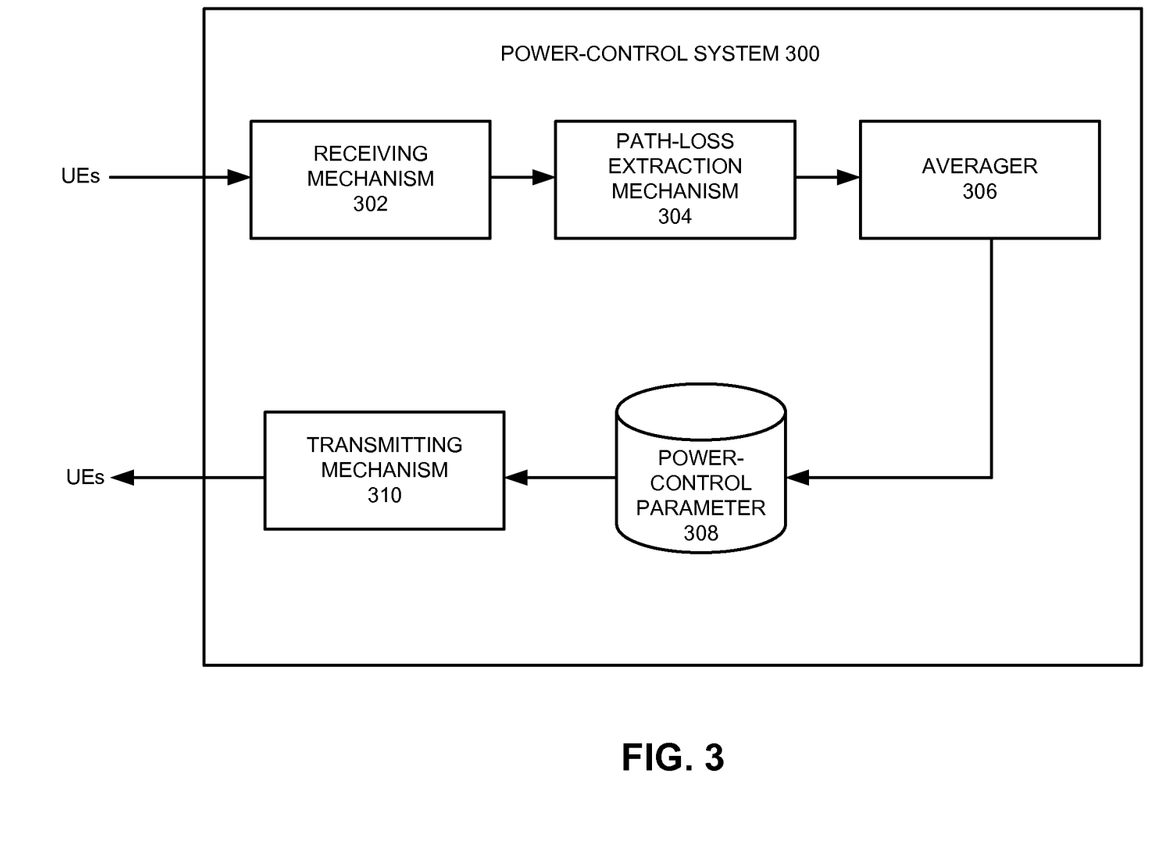
FIG. 3 presents an exemplary power-control system for dynamically setting uplink power-control parameters, in accordance with an embodiment of the present invention.

FIG. 3 presents an exemplary power-control system for dynamically setting uplink power-control parameters, in accordance with an embodiment of the present invention. Power-control system 300 includes a receiving mechanism 302, a path-loss extraction mechanism 304, an averager 306, a power-control parameter database 308, and a transmitting mechanism 310.

During operation, receiving mechanism 302 receives RSRP reports from UEs in a cell and sends the RSRP reports to path-loss extraction mechanism 304, which extracts path-loss information, including path-loss to the serving cell and path-loss to the neighboring cells, from the RSRP reports. Averager 306 averages the path-loss over the UEs that send the RSRP. In addition, averager 306 also averages the path-loss over a relatively long time interval, such as hours, weeks, and days. In one embodiment, averager 306 calculates a combined path-loss by calculating an arithmetic mean, a geometric mean, or a quadratic mean of the path-loss to the serving cell and the path-loss to the neighbors.

The average path-loss or the combined average path-loss is mapped to a set of power-control parameters stored in power-control parameter database 308. In one embodiment, the average path-loss is first mapped to a cell type that belongs to a set of previously defined cell types, and each cell type is mapped to a set of previously determined power-control parameters. The mapped power-control parameters are then sent to transmitting mechanism 310, which transmits the power-control parameters to the UEs in the cell, thus allowing the UEs to adjust their transmitting powers accordingly.

Figure 4:
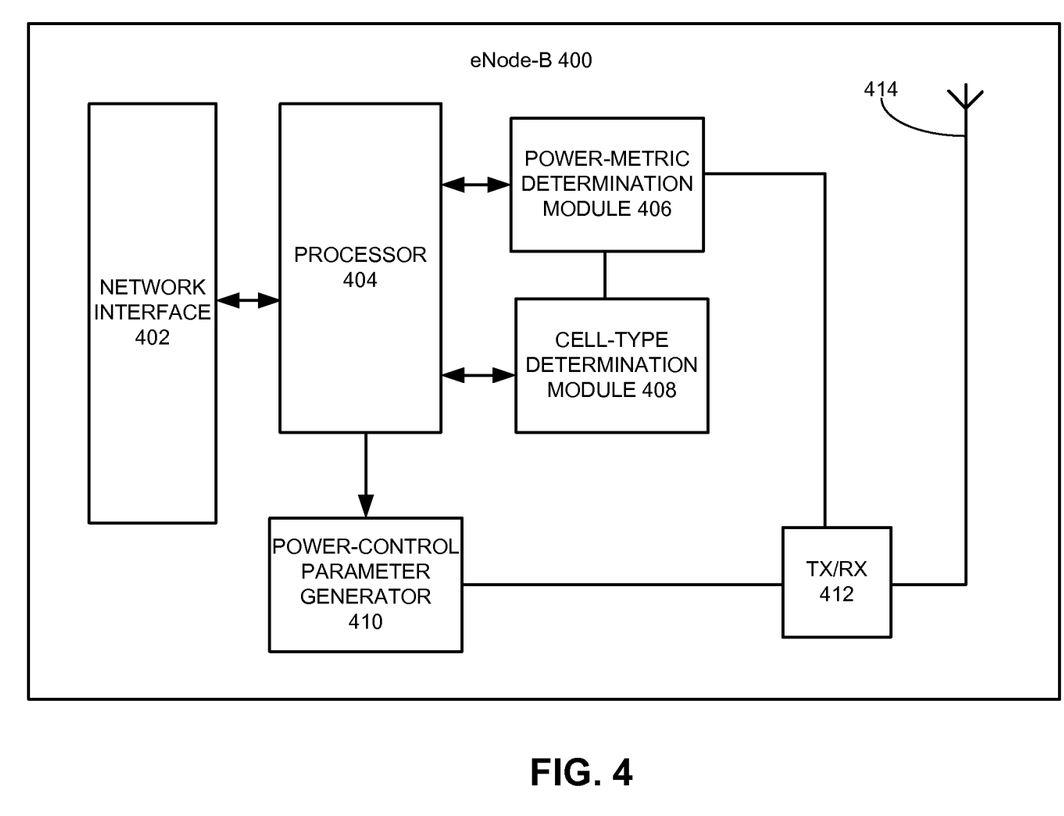
FIG. 4 illustrates an exemplary eNode-B capable of setting uplink power-control parameters, in accordance with an embodiment of the present invention.

FIG. 4 illustrates an exemplary eNode-B capable of setting uplink power-control parameters, in accordance with an embodiment of the present invention. An eNode-B 400 includes a network interface 402, a processor 404, a power-metric determination module 406, a cell-type determination module 408, a power-control-parameter generator 410, a transceiver 412, and an antenna 414. During operation, eNode-B 400 interacts with the core network via network interface 402. Processor 404 executes applications for power-metric determination module 406, cell-type determination module 408, and power-control-parameter generator 410. Transceiver 412 receives uplink signals from UEs and transmits downlink signals (including the generated uplink power-control parameters) to the UEs via antenna 414.

Embodiments of the present invention provide an uplink power-control solution that sets uplink power-control parameters for a cell based on long-term averaged path-loss metrics for that cell. Because the uplink power-control parameters are individually set for each cell, the performance of the entire network is improved significantly compared with the conventional solution where a set of uplink power-control parameters are uniformly applied to all cells in the network. Moreover, because this solution does not require information exchange among eNode-Bs and does not require an operator to adjust uplink power-control parameters manually at each eNode-B, this solution can drastically reduce network maintenance cost.

Note that the process shown in FIG. 2 and the system architecture shown in FIG. 3 are merely exemplary and should not limit the scope of this disclosure. For example, the system may use other types of power-related metrics than the path-loss metrics mentioned in this disclosure to categorize cells and to assign power-control parameters as long as such metrics can differentiate the interference-limited cells and the noise-limited cells. For example, the system may assign uplink power-control parameters based on a metric that measures maximum path-loss to the serving cell. In addition, the power-control parameters shown in the tables are merely exemplary as well. Other power-control parameters are also possible, as long as they can improve the uplink performance.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computing system for setting uplink power-control parameters for a cell within a wireless network, the system comprising:
    a power-metric determination mechanism configured to determine a long-term power metric for the cell based on an average uplink path-loss parameter calculated over a plurality of user devices over a pre-determined time interval;
    a cell-type determination mechanism configured to determine a type for the cell based on the long-term power metric; and
    a power-control-parameter determination mechanism configured to determine a set of power-control parameters for the cell based on the cell type.

2. The computing system of claim 1, wherein the wireless network is a Long Term Evolution (LTE) network.

3. The computing system of claim 1, wherein the uplink path-loss parameter includes a loss-to-serving-cell portion indicating path-loss between a user device and a base station located in the cell and a loss-to-neighbors portion indicating path-loss between a user device and base stations located at neighboring cells.

4. The computing system of claim 3, wherein the loss-to-serving-cell portion is based on an average path loss over all active UEs within the cell, and the loss-to-neighbors portion is based on an average path loss over all UEs that report a reference signal received power (RSRP).

5. The computing system of claim 1, wherein the long-term power metric is determined based on an average path loss to a base station in the cell and an average path loss to a base station in a neighboring cell.

6. The computing system of claim 1, wherein the predetermined time interval is a number of hours, days, or weeks.

7. The computing system of claim 1, further comprising a lookup table indicating mapping between a cell type and a set of power-control parameters.

8. A non-transitory computer-readable storage medium storing instructions that when executed by a computer cause the computer to perform a method for setting uplink power-control parameters for a cell within a wireless network, the method comprising:
    determining a long-term power metric for the cell based on an average uplink path-loss parameter calculated over a plurality of user devices over a pre-determined time interval;
    determining a type for the cell based on the long-term power metric; and
    transmitting a set of power-control parameters for the cell based on the cell type.

9. The computer-readable storage medium of claim 8, wherein the wireless network is a Long Term Evolution (LTE) network.

10. The computer-readable storage medium of claim 8, wherein the uplink path-loss parameter includes a loss-to-serving-cell portion indicating path-loss between the user device and the base station and a loss-to-neighbors portion indicating path-loss between the user device and base stations located at neighboring cells.

11. The computer-readable storage medium of claim 10, wherein the loss-to-serving-cell portion is based on an average path loss over all active UEs within the cell, and the loss-to-neighbors portion is based on an average path loss over all UEs that report a reference signal received power (RSRP).

12. The computer-readable storage medium of claim 8, wherein the long-term power metric is determined based on an average path loss to a base station in the cell and an average path loss to a base station in a neighboring cell.

13. The computer-readable storage medium of claim 8, wherein the predetermined time interval is a number of hours, days, or weeks.

14. The computer-readable storage medium of claim 8, wherein the method further comprises looking up a lookup table indicating mapping between a cell type and a set of power-control parameters.

15. A computer-executable method for setting uplink power-control parameters for a cell within a wireless network, the method comprising:
    determining a long-term power metric for the cell based on an average uplink path-loss parameter calculated over a plurality of user devices over a pre-determined time interval;
    determining a type for the cell based on the long-term power metric; and
    transmitting a set of power-control parameters for the cell based on the cell type.

16. The method of claim 15, wherein the wireless network is a Long Term Evolution (LTE) network.

17. The method of claim 15, wherein the uplink path-loss parameter includes a loss-to-serving-cell portion indicating path-loss between the user device and the base station and a loss-to-neighbors portion indicating path-loss between the user device and base stations located at neighboring cells.

18. The method of claim 17, wherein the loss-to-serving-cell portion is based on an average path loss over all active UEs within the cell, and the loss-to-neighbors portion is based on an average path loss over all UEs that report a reference signal received power (RSRP).

19. The method of claim 15, wherein the long-term power metric is determined based on an average path loss to a base station in the cell and an average path loss to a base station in a neighboring cell.

20. The method of claim 15, wherein the predetermined time interval is a number of hours, days, or weeks.

21. The method of claim 15, further comprising looking up a lookup table indicating mapping between a cell type and a set of power-control parameters.

* * * * *